(12) United States Patent
Owens et al.

(10) Patent No.: US 8,955,573 B2
(45) Date of Patent: Feb. 17, 2015

(54) APPARATUS FOR A PLASTER TAPING DEVICE

(76) Inventors: Eamonn Oliver Owens, Werribee (AU); Daniel Luke Owens, Werribee (AU)

(*) Notice: Subject to any disclaimer, the term of this patent is extended or adjusted under 35 U.S.C. 154(b) by 11 days.

(21) Appl. No.: 13/577,403

(22) PCT Filed: Feb. 4, 2011

(86) PCT No.: PCT/AU2011/000119
§ 371 (c)(1),
(2), (4) Date: Feb. 12, 2013

(87) PCT Pub. No.: WO2011/094820
PCT Pub. Date: Aug. 11, 2011

(65) Prior Publication Data
US 2013/0192765 A1    Aug. 1, 2013

(30) Foreign Application Priority Data
Feb. 4, 2010 (AU) ............... 2010900446

(51) Int. Cl.
| | | |
|---|---|---|
| B44C 7/00 | (2006.01) |
| B32B 37/00 | (2006.01) |
| E04F 21/00 | (2006.01) |
| E04F 21/165 | (2006.01) |
| B29C 65/00 | (2006.01) |

(52) U.S. Cl.
CPC ............ *B32B 37/0046* (2013.01); *E04F 21/00* (2013.01); *E04F 21/165* (2013.01)
USPC ............ 156/577; 156/574; 156/575; 156/579

(58) Field of Classification Search
CPC .......... B32B 31/00; B32B 37/00; B44C 7/00; B44C 7/02; B44C 7/04; B44C 7/06; B44C 7/08; B65H 35/00; B65H 35/07
USPC .......................... 156/433, 527, 577, 579, 574
See application file for complete search history.

(56) References Cited

U.S. PATENT DOCUMENTS

| | | |
|---|---|---|
| 3,116,195 A | 12/1963 | Lathrop et al. |
| 3,260,638 A | 7/1966 | Hoveland |
| 3,880,701 A | 4/1975 | Moree |
| 4,080,240 A * | 3/1978 | Dysart .......................... 156/575 |
| 4,086,121 A * | 4/1978 | Ames ............................ 156/526 |
| 4,105,490 A | 8/1978 | Lass |

(Continued)

FOREIGN PATENT DOCUMENTS

GB    2254064 A  *  9/1992

OTHER PUBLICATIONS

Chitsaka, Pascar, International Preliminary Report on Patentability, May 23, 2012, 16 pages, Australian Patent Office, Australia.

(Continued)

*Primary Examiner* — Alex Efta
(74) *Attorney, Agent, or Firm* — Mark A. Oathout; Oathout Law Firm

(57) ABSTRACT

The present invention resides in an apparatus for use with a plaster taping device, the apparatus comprising a base for removably attaching the apparatus to the plaster taping device and a frame having a first end coupled to the base and a second end for supporting a wheel member rotatably connected thereto, wherein the wheel member facilitates application of a tape material along an internal corner joint.

16 Claims, 3 Drawing Sheets

(56) References Cited

U.S. PATENT DOCUMENTS

| | | | |
|---|---|---|---|
| 4,196,028 A * | 4/1980 | Mills et al. ............... 156/71 |
| 4,197,624 A | 4/1980 | Lass |
| 4,208,239 A | 6/1980 | Lass |
| 4,358,337 A * | 11/1982 | Johnson et al. ........... 156/526 |
| 4,451,223 A | 5/1984 | Mower et al. |
| 5,114,527 A * | 5/1992 | Stern et al. ............... 156/575 |
| 5,545,287 A | 8/1996 | Carlson |
| 5,814,184 A | 9/1998 | Denkins |
| 6,513,562 B1 * | 2/2003 | Trout ......................... 156/391 |
| 6,540,002 B1 | 4/2003 | Edwards et al. |
| 6,712,238 B1 | 3/2004 | Mills |
| 7,325,582 B2 * | 2/2008 | Smythe et al. ............ 156/527 |
| 7,621,309 B1 | 11/2009 | Mondloch et al. |

OTHER PUBLICATIONS

Lee, Shu-Yen, Written Opinion of the International Searching Authority, Mar. 29, 2011, 5 pages, Australian Patent Office, Australia.

Lee, Shu-Yen, International Search Report, Mar. 29, 2011, 3 pages, Australian Patent Office, Australia.

\* cited by examiner

APPARATUS FOR A PLASTER TAPING DEVICE

FIELD OF THE INVENTION

The present invention relates to finishing tools used in building construction and more particularly to finishing tools for plastering drywalls. In particular, but not exclusively, the present invention relates to an apparatus for a plaster taping device. The apparatus has particular utility for applying pre-coated paper tape to internal corner joints. However, it will be appreciated that the present invention has broader application and is not limited to that particular use.

BACKGROUND TO THE INVENTION

Drywall taping machines are used to simultaneously apply tape and mud or plaster over drywall joints when finishing the wall surface. These devices are commonly referred to as banjo taping machines or plaster taping banjos respectively. The plaster taping devices comprise a tracking wheel fitting at a front end which grips the tape dispensed from the device and presses it over the joint, spreading the plaster mixture evenly behind the tape. However, the tracking wheel fitting generally comprises one or more serrated rollers which are limited to applying tape to a joint over a flat surface and cannot be used to access and apply the tape to internal corner joints. Therefore, a tradesman must apply the tape and plaster to the internal corner joints by hand which is awkward and laborious.

There have been many hand-held tools developed with angled surfaces or rollers for facilitating the smoothing of the plaster tape along an internal corner joint. However, these tools must be used as a secondary tool after the plaster tape has been applied to the wall, which requires a two-step process.

In this specification, the terms "comprises", "comprising" or similar terms are intended to mean a non-exclusive inclusion, such that an assembly and/or portable shower that comprises a list of elements does not include those elements solely, but may well include other elements not listed.

OBJECT OF THE INVENTION

It is a preferred object of the present invention to provide an apparatus for a plaster taping device, that addresses or at least ameliorates one or more of the aforementioned problems of the prior art.

It is a preferred object of the present invention to provide an apparatus for a plaster taping device which provides an interchangeable attachment for a plaster taping device to suit internal corner joints of varying angles.

SUMMARY OF THE INVENTION

Generally, embodiments of the present invention relate to an apparatus for a plaster taping device.

According to one aspect, although not necessarily the broadest aspect, the present invention resides in an apparatus for use with a plaster taping device, the apparatus comprising:
a base for removably attaching the apparatus to the plaster taping device; and
a frame having a first end coupled to the base and a second end for supporting a wheel member rotatably connected thereto;
wherein the wheel member facilitates application of a tape material along an internal corner joint.

Preferably, the apparatus is an interchangeable attachment for a plaster taping banjo.

Preferably, the base comprises an attachment means for removably attaching the apparatus to the plaster taping device.

Preferably, the attachment means is in the form of a slot.

Suitably, the slot is an elongated slot extending inwardly from a first side of the base and is adapted to receive a fastener therethrough.

Suitably, a base of the frame is integrally formed with the base of the apparatus.

Preferably, the frame has a pair of spaced apart arm members integrally formed with and extending outwardly from the base of the frame.

Suitably, the arm members are angled to hold the wheel member such that it is radially spaced apart from the base of the apparatus.

Suitably, the arm members comprise an aperture for receiving a retaining bolt therethrough.

According to another aspect, although again not necessarily the broadest aspect, the present invention resides in a plaster taping device comprising an apparatus, the apparatus comprising:
a base for removably attaching the apparatus to the plaster taping device; and
a frame having a first end coupled to the base and a second end for supporting a wheel member rotatably connected thereto;
wherein the wheel member facilitates application of a tape material along an internal corner joint.

Preferably, the wheel member is rotatably attached to the frame via the retaining bolt.

Preferably, the periphery of the wheel member has a v-shaped profile comprising a pair of tread surfaces which meet together at a predetermined angle.

Preferably, the pair of tread surfaces meet at a predetermined angle between ninety degrees and one hundred and eighty degrees.

Suitably, the apparatus further comprises a pair of serrated discs positioned on either side of the wheel member.

Suitably, the serrated discs lie perpendicular to the wheel member and are suitably sized such that they can meet the tape dispensed from the plaster taping device at ninety degrees on each side as the wheel member rotates.

Suitably, the arm members of the frame can be hingedly connected to the base of the frame such that the positioning of the wheel member can be adjusted.

Further features and forms of the present invention will become apparent from the following detailed description.

BRIEF DESCRIPTION OF THE DRAWINGS

In order that the invention may be readily understood and put into practical effect, reference will now be made to embodiments of the present invention with reference to the accompanying drawings, wherein like reference numbers refer to identical elements. The drawings are provided by way of example only, wherein.

Figure 1:
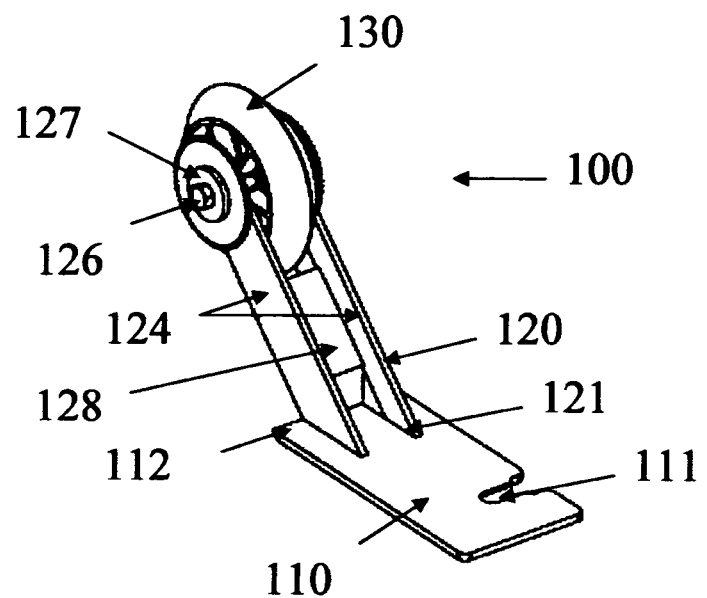
FIG. 1 is a perspective view of an apparatus for a plaster taping device according to embodiments of the present invention.

Skilled addressees will appreciate that elements in the drawings are illustrated for simplicity and clarity and have not necessarily been drawn to scale. For example, the relative dimensions of some of the elements in the drawings may be distorted to help improve understanding of embodiments of the present invention.

DETAILED DESCRIPTION OF THE INVENTION

Embodiments of the present invention will be described with reference to an apparatus for a plaster taping device which provides an interchangeable attachment for the plaster taping device to suit internal corner joints of varying angles. For convenience sake, the apparatus will be described herein as an attachment for a plaster taping banjo. However, it should be appreciated that embodiments of the present invention can be modified to suit different plaster taping banjos and/or other drywall taping machines and devices. It will be appreciated that variations may need to be made as required.

Referring to FIG. 1, the apparatus 100 for a plaster taping device is provided in accordance with embodiments of the present invention. According to some embodiments of the invention, the apparatus 100 is made of a metal material such as aluminium or stainless steel or the like. However, it is envisaged that the apparatus 100 and/or its components can be made of any other suitable material such as plastic or the like. The apparatus 100 comprises a base 110 for removably attaching the apparatus 100 to the plaster taping device. The base 110 enables the apparatus 100 to be interchangeable with an existing tracking wheel fitting provided on a plaster taping banjo. Preferably, the base 110 is substantially rectangular in shape. Preferably, the base 110 is similar in shape to the existing tracking wheel fitting for the plaster taping banjo to facilitate interchanging between the two attachments. However, it is envisaged that shape of the base 110 may be modified to suit different plaster taping banjos and/or other plaster taping devices.

Preferably, the base 110 comprises an attachment means for enabling the base to be removably attached to the plaster taping device. According to some embodiments, as illustrated in FIG. 1, the attachment means is in the form of a slot 111 which allows the base 110 to be attached to a front end of the plaster taping banjo. The slot 111 enables the base 110 to be slidably attached to the plaster taping device. Suitably, the slot 111 is in the form an open-ended elongate slot which extends inwardly from a first side of the base 110 and is adapted to receive a fastener (not shown) such as a screw or bolt or the like therethrough, to secure the base 110 of the apparatus 100 to the plaster taping banjo.

In an alternative embodiment, the attachment means can be in the form of a closed slot or aperture or any other suitable attachment means such as a clip or the like to suit the device to which it is intended to be attached. Similarly, it is envisaged that the attachment means is capable of being secured via the fastening member provided on current plaster taping banjos and similar devices.

As illustrated in FIG. 1, a frame 120 is provided at a first end 112 of the base 110 for supporting a wheel member 130. A first end 121 of the frame 120 is integrally formed with the base 110. Preferably, the first end 121 comprises a base of the frame 120. In an alternative embodiment, the base 121 of the frame 120 can be in the form of an attachment portion comprising at least one aperture for receiving a fastener therethrough in order to secure the frame 120 to the first end 112 of the base 110.

The frame 120 comprises a pair of spaced apart arm members 124 integrally formed with and extending outwardly from the base 121 of the frame 120. A support 128 can be positioned between the arm members 124. According to some embodiments, the arm members 124 are angled away from the base 110 of the apparatus 100 to hold the wheel member 130 such that it is radially spaced apart from the base 110 of the apparatus 100. In an alternate embodiment, it is envisaged that the arm members 124 can be hingedly connected to the attachment portion 121 of the frame 120 so that the positioning of the wheel member 130 can be adjusted. The wheel member 130 is supported and secured in position between the spaced apart arm members via a retaining bolt 126.

The retaining bolt 126 enables the wheel member 130 to be rotatably attached to the frame 120 and functions as an axle for the wheel member 130. In an alternate embodiment, it is envisaged that a rod-like member for enabling the wheel member 130 to be rotatably attached to the apparatus 100 can be utilized. A threaded end of the retaining bolt 126 is preferably secured to the frame 120 at one end via a nut or other suitable securing means. A washer 127 can be positioned on the outer side of the arm members, between a head of the retaining bolt 126 and the arm member 124 on one side and between the nut and the arm member 124 on an opposing side.

Figure 2:
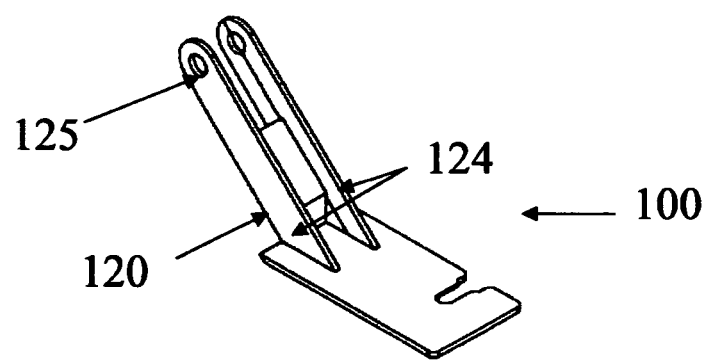
FIG. 2 is a perspective view of the apparatus of FIG. 1 showing a frame of the apparatus according to embodiments of the present invention.

As illustrated in FIG. 2, the arm members 124 of the frame 120 of the apparatus 100 comprise an aperture 125 at their exposed end for receiving the retaining bolt 126 therethrough. In an alternative embodiment, it is envisaged that any other suitable support member can be used to support and/or secure the wheel member.

Figure 3:
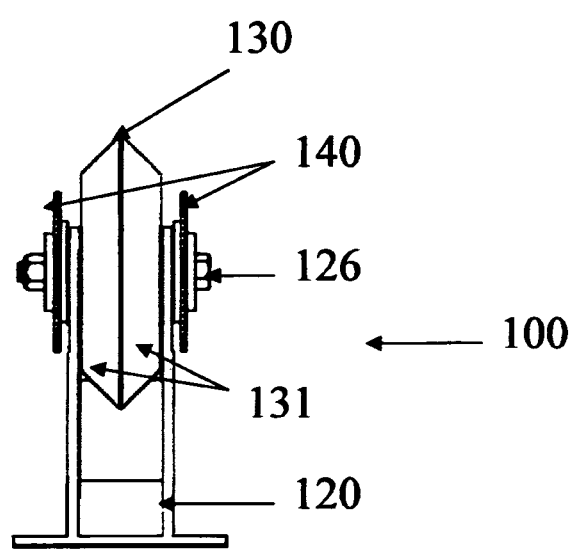
FIG. 3 is an end view of a first end of the apparatus of FIG. 1 according to embodiments of the present invention.

Referring now to FIG. 3, the apparatus 100 comprises at least one serrated disc 140. Preferably, the apparatus 100 includes a pair of serrated discs 140 which are positioned on either side of the wheel member 130. Preferably, the serrated discs 140 have a central aperture (not illustrated) which enables the retaining bolt 126 to be passed therethrough, for retaining the serrated discs 140 on either side of the wheel member 130. Preferably, the serrated discs 140 lie parallel to the wheel member 130 and are suitably sized such that they can meet the tape dispensed from the plaster taping device at ninety degrees on each side as the wheel member 130 rotates. The serrated discs 140 are adapted to grip the tape as it is dispensed from the plaster taping device, squeezing the plaster mix and continually bedding the tape to the plasterboard or drywall.

As illustrated in FIG. 3, the wheel member 130 is in the form of a roller wheel. Preferably, the wheel member 130 has a central aperture (not illustrated) which enables the retaining bolt 126 to be passed therethrough for retaining the wheel member 130 such that it can rotate thereabout. The periphery of the wheel member 130 has a v-shaped profile comprising a pair of angled tread surfaces 131 which meet at a predetermined angle, to aid in creasing the tape and bedding it into a corner joint. Preferably, the periphery of the wheel member 130 refers to the outer edge or surface or the wheel member 130.

Figure 4:
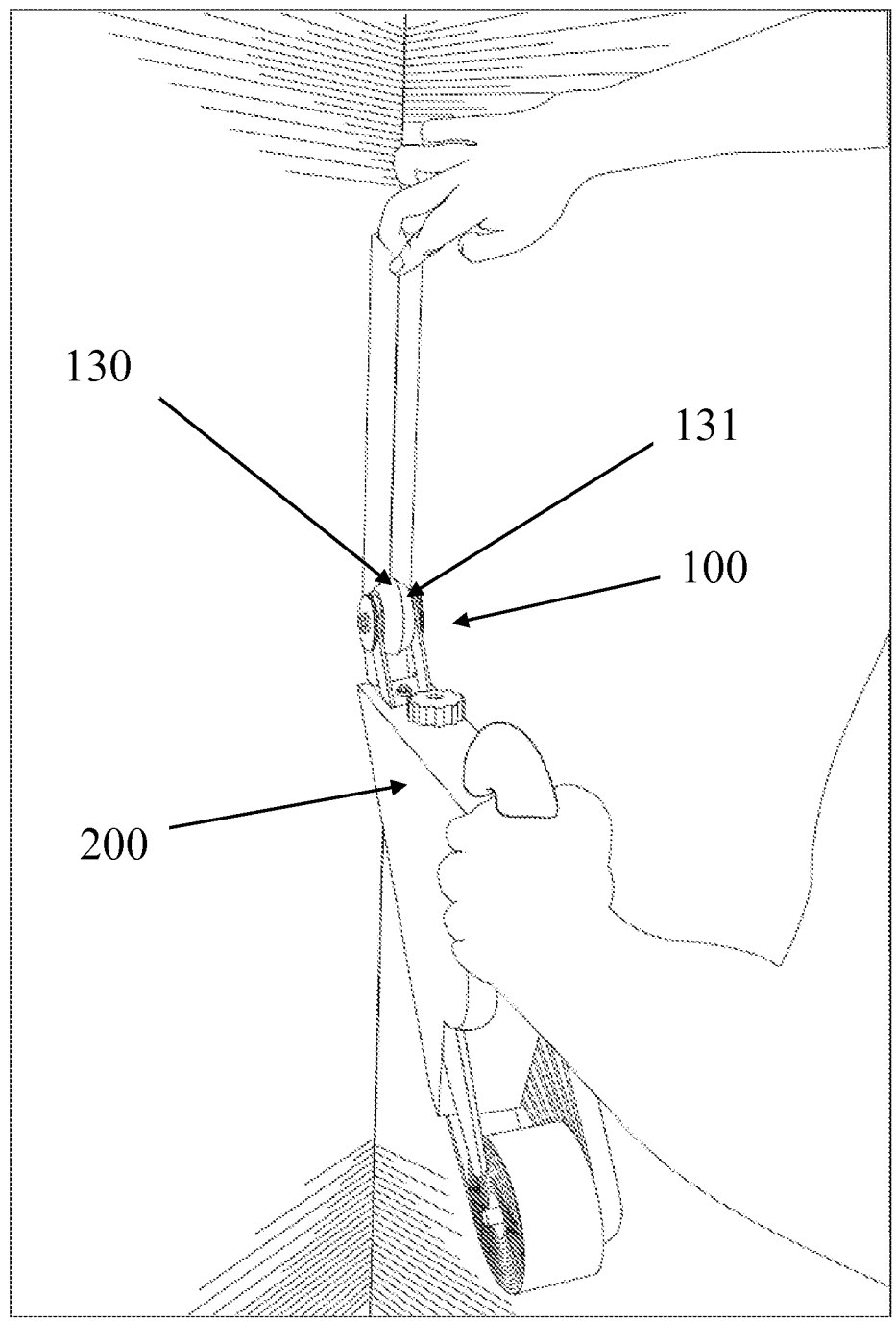
FIG. 4 is a perspective view of the plaster taping device of FIG. 1 attached to a plaster taping banjo applying a pre-coated tape material to an internal corner joint.

Referring now to FIG. 4 which illustrates a plaster taping device 200 having the apparatus 100 attached thereto, the wheel member 130 is shown having a pair of tread surfaces 131 which meet at an angle of ninety degrees such that the tread surfaces 131 of the wheel member 130 abut the side walls of a ninety degree corner joint formed between two intersecting plasterboards or drywalls. It is envisaged that the angle at which the tread surfaces 131 meet can be varied to suit different internal angles for a corner joint. For example, the angle of the tread surfaces 131 can be modified to suit walls having obtuse internal angles between ninety degrees and one hundred and eighty degrees.

Hence, the apparatus 100 of the present invention thus provides a solution to the aforementioned problems of the prior art by providing an apparatus 100 for plaster taping devices which can be readily interchanged with the existing fitting of a plaster taping device to enable the tape to be applied to internal corners. The wheel members 130 having a surface of different angles enables the plaster taping device to apply pre-coated paper tape exiting the plaster taping device to internal corners of different angles and embed the tape in the one movement, resulting in a smooth and even application of plaster mix to the tape. This eliminates bubbles and makes it quick and easy to use. Thus, the labor time for internal corner application is substantially reduced.

Throughout the specification the aim has been to describe the invention without limiting the invention to any one embodiment or specific collection of features. Persons skilled in the relevant art may realize variations from the specific embodiments that will nonetheless fall within the scope of the invention.

We claim:

1. An apparatus for use with a plaster taping banjo, the apparatus comprising:
    a base for removably attaching the apparatus to the plaster taping banjo; and
    a frame having a first end coupled to the base and a second end supporting a wheel member rotatably connected thereto;
    wherein a periphery of the wheel member has a v-shaped profile comprising a pair of tread surfaces which meet together at a predetermined angle to apply tape coated with plaster mix exiting the banjo along a first side and a second side of an internal corner joint and into an apex of the internal corner joint;
    wherein a pair of serrated discs having a smaller radius than the wheel member are rotatably coupled to the second end, the pair of serrated discs positioned on either side of the wheel member and coaxial with the wheel member such that the tape when applied to the internal corner joint is applied along the first side and the second side of the internal corner joint and embedded into the apex of the internal corner joint in one movement by the wheel member and the serrated disks resulting in an even application of the tape and plaster mix.

2. The apparatus of claim 1 wherein, the apparatus is an interchangeable attachment for a plaster taping device.

3. The apparatus of claim 1, wherein the base comprises an attachment means for removably attaching the apparatus to the plaster taping device.

4. The apparatus of claim 3, wherein the attachment means is in the form of a slot.

5. The apparatus of claim 4, wherein the slot is an elongated slot extending inwardly from a first side of the base.

6. The apparatus of claim 4, wherein the slot is adapted to receive a fastener therethrough.

7. The apparatus of claim 1, wherein a base of the frame is integrally formed with the base of the apparatus.

8. The apparatus of claim 1, wherein the frame has a pair of spaced apart arm members integrally formed with the base of the apparatus.

9. The apparatus of claim 8, wherein the pair of spaced apart arm members extend outwardly from a base of the frame.

10. The apparatus of claim 8, wherein the arm members are angled to hold the wheel member such that the wheel member is radially spaced apart from the base of the apparatus.

11. The apparatus of claim 8, wherein the arm members further comprise an aperture for receiving a retaining bolt therethrough.

12. The apparatus of claim 11, wherein the wheel member is rotatably attached to the frame via the retaining bolt.

13. The apparatus of claim 1, wherein the predetermined angle is between ninety degrees and one hundred and eighty degrees.

14. The apparatus of claim 1, wherein the serrated discs lie parallel to the wheel member and are suitably sized such that they can meet the tape dispensed from the plaster taping device at substantially ninety degrees on each side as the wheel member rotates.

15. The apparatus of claim 1, wherein the frame comprises a pair of spaced apart arm members hingedly connected to a base of the frame such that the positioning of the wheel member can be adjusted.

16. A plaster taping banjo comprising the apparatus of claim 1.

* * * * *